United States Patent

Satou et al.

[11] 4,015,079
[45] Mar. 29, 1977

[54] GAMMA CORRECTION CIRCUIT

[75] Inventors: Itsuzou Satou; Kikuo Saitou, both of Yokohama, Japan

[73] Assignee: Tokyo Shibaura Electric Co., Ltd., Kawasaki, Japan

[22] Filed: Apr. 8, 1976

[21] Appl. No.: 675,144

Related U.S. Application Data

[63] Continuation of Ser. No. 476,794, June 6, 1974, abandoned.

[30] Foreign Application Priority Data

June 12, 1973 Japan .............. 48-66217

[52] U.S. Cl. .......... 358/164; 178/DIG. 16; 307/230; 328/142; 328/145
[51] Int. Cl.² ...................... H04N 5/20
[58] Field of Search ............ 178/7.1, DIG. 16; 307/230; 328/142–145

[56] References Cited

UNITED STATES PATENTS

| | | | |
|---|---|---|---|
| 3,239,694 | 3/1966 | Rovell | 307/230 X |
| 3,341,654 | 9/1967 | Pay et al. | 178/DIG. 16 |
| 3,371,269 | 2/1968 | Wattson | 307/230 X |
| 3,386,081 | 5/1968 | Varsos | 307/230 X |
| 3,428,884 | 2/1969 | Nordahl | 328/142 X |
| 3,622,699 | 11/1971 | Richeson, Jr. | 178/DIG. 16 |
| 3,633,121 | 1/1972 | Bretl | 178/DIG. 16 |
| 3,708,615 | 1/1973 | Wharton | 358/32 |
| 3,793,480 | 2/1974 | Waehner | 178/DIG. 16 |

*Primary Examiner*—Robert L. Griffin
*Assistant Examiner*—Mitchell Saffian
*Attorney, Agent, or Firm*—Oblon, Fisher, Spivak, McClelland & Maier

[57] ABSTRACT

A gamma correction circuit is disclosed which includes an amplifier for amplifying a video input signal, a series connection of diode connected transistors whose input terminal is coupled to the output terminal of the amplifier and a cascade connection of emitter follower transistors whose output terminal is connected to the output terminal of the series connection of the diode connected transistors and is grounded through a resistor and whose input terminal is supplied with control signals.

4 Claims, 8 Drawing Figures

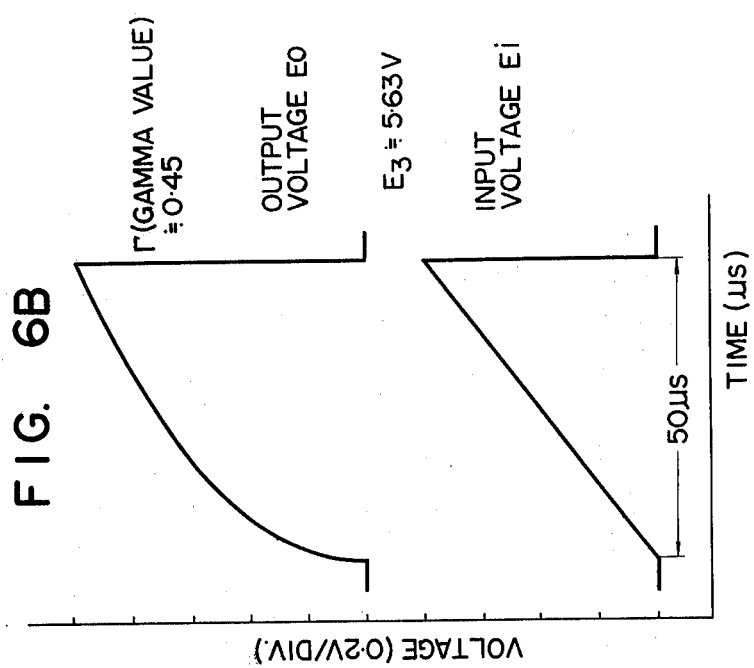
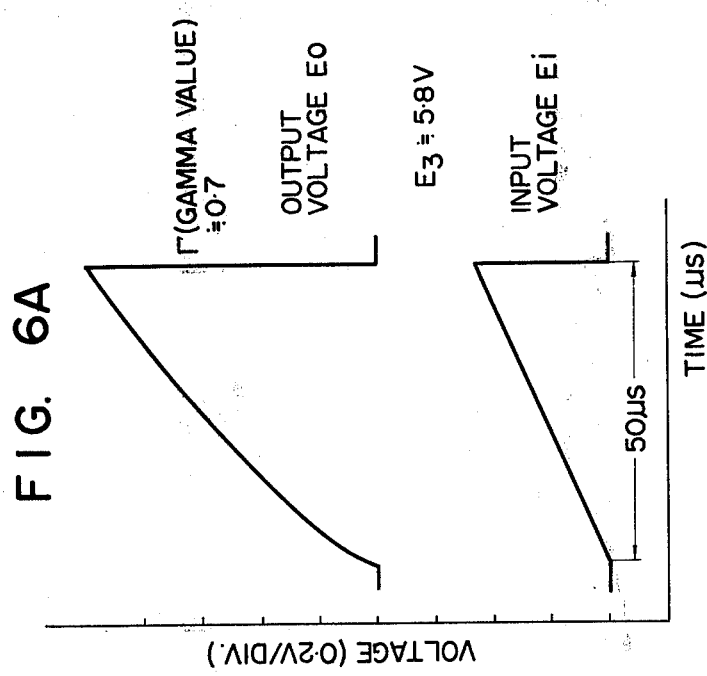

GAMMA CORRECTION CIRCUIT

This is a continuation, of application Ser. No. 476,794, filed June 6, 1974, now abandoned.

This invention relates to a gamma circuit and more particularly to a gamma circuit to which temperature compensation is applied.

The gamma circuit is also referred to as a gamma correction circuit. This circuit is used, for example, with a color television camera to display the gamma characteristics, namely, nonlinear input-output characteristics. If, with a color picture tube, a luminous output could bear a direct proportion to a signal supplied to the grid, then the input-output characteristics of the color picture tube would become linear, reproducing an ideal image. In fact, however, the luminous output is proportional to a power of about 2.2 of the grid input signal, resulting in the nonlinear input-output characteristics of the color picture tube. If, therefore, an output signal from a color television camera corresponding to a foreground subject is delivered intact to a color television tube, then not only the brightness, but also the color shade and chromaticity on the screen of the color picture tube will be widely different from what is directly derived from the foregound subject. Accordingly, the aforesaid essential nonlinear input-output characteristics of the color picture tube are offset by the counteracting nonlinear input-output characteristics of the gamma circuit whose output amplitude is substantially proportional to a power of a reciprocal of about 2.2 of the input amplitude. Thus, a luminous output from the color picture tube bears a substantially direct proportion to an input signal to a color television camera, attaining a linear relationship therebetween and eventually enabling the image of the foreground subject to be reproduced exactly on the screen of the picture tube.

The prior art gamma circuit comprises an amplifier for amplifying an input video signal, and first and second diodes whose anodes are connected parallel to the output terminal of said amplifier through the corresponding resistors, and whose cathodes are supplied with control signals. Where the output voltage from the amplifier is increased to render the diodes conducting, the resistors connected between the amplifier and diodes provide resistance parallel to the amplifier.

Where the control voltage supplied to the cathode of the second diode is chosen to have a higher level than the control voltage of the cathode of the first diode, the first and second diodes are conducted in turn in accordance with the increase of the output voltage from the amplifier, thereby increasing resistance applied to the output terminal of the amplifier and varying the degree of amplification by the amplifier. Therefore, the input-output characteristics of the amplifier are changed when the first and second diodes are turned conductive. Since the turn-on voltage of the diodes corresponds to the control voltage of the cathodes thereof, the input-output characteristics of the prior art gamma circuit denote the polygonal curve wherein the characteristic-changing points correspond to the turn-on voltages of the diodes. Thus the conventional gamma circuit arranged as described above provides the polygonal gamma characteristics approximating counteracting nonlinear input-output characteristics which offset the essential non-linear input-output characteristics of the picture tube.

However, the prior art gamma circuit has the disadvantage of being noticeably affected by variation in ambient temperature. The forward barrier voltage conversely falls with increasing ambient temperature and rises with a decline thereof. Thus, the turn-on voltage of the diode varies with ambient temperature. Where the turn-on voltage is reduced due to increased temperature, resistance in the output circuit of the amplifier falls, resulting in a decline in the output voltage of the gamma circuit. With increasing ambient temperature, therefore, the characteristic-varying points of the polygonal gamma characteristics are shifted to the lower output voltages of the gamma circuit, thereby leading to the change of the gamma characteristics.

The change of the gamma characteristics affects an image on the screen of the picture tube, thereby preventing the exact image of the foreground subject from being reproduced. Attempts taken to date to eliminate such difficulties have been (1) to hold a diode in a thermostat, and (2) to increase the amplitude of the amplifier so as to magnify a video signal, thereby relatively reducing the variation of the forward barrier voltage of the diode.

However, the process (1) takes time for the gamma circuit to attain a normal operation and becomes bulky due to additional power requirement for maintenance of constant heat, failing to be put to practical application. The process (2) is accompanied with the drawbacks of a maximum power capacity, and presents difficulties in providing an integrated circuit. Further disadvantage of the conventional gamma circuit is that it utilizes polygonal characteristics approximating nonlinear gamma characteristics which offset essential nonlinear input output characteristics of the picture tube.

It is accordingly an object of this invention to provide a gamma circuit which displays by simple arrangement stable gamma characteristics to any variation in ambient temperature.

Another object of this invention is to provide a gamma circuit requiring a small power capacity and admitting of its easy integration.

Still another object of this invention is to provide a gamma circuit displaying smoothly curved gamma characteristics.

According to this invention, there is provided a gamma circuit comprising an amplifier for amplifying a video input signal, a nonlinear semiconductor element coupled to the output terminal of the amplifier and an emitter follower circuit whose emitter output terminal is connected to the output terminal of the semiconductor element and whose base input terminal is supplied with a control signal.

This invention can be more fully understood from the following detailed description when taken in conjunction with the accompanying drawings, in which.

Figure 5:
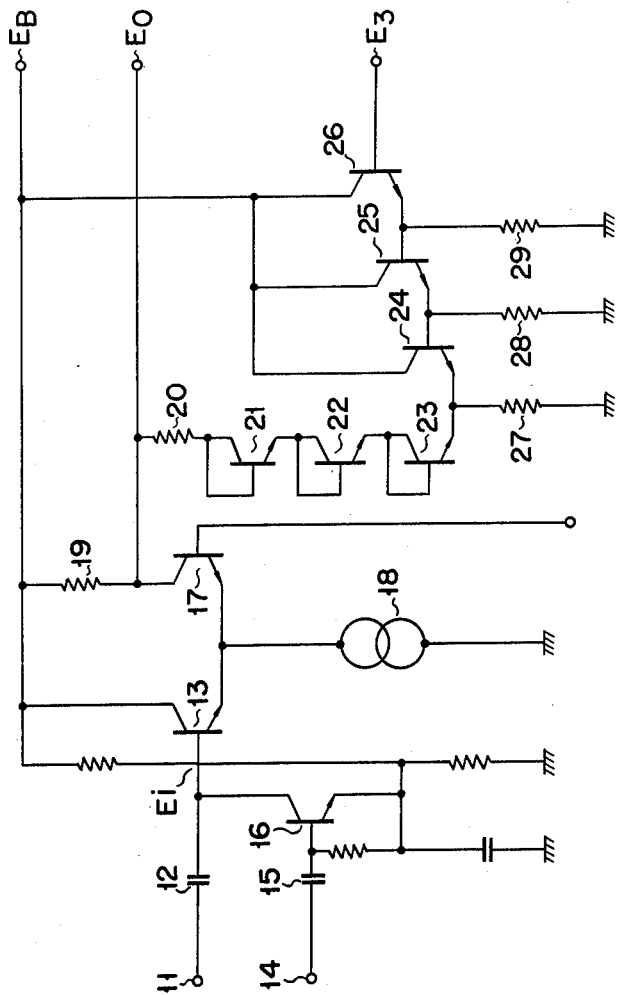
FIG. 5 is a circuit diagram of another embodiment of a gamma circuit of this invention.
Figure 7:
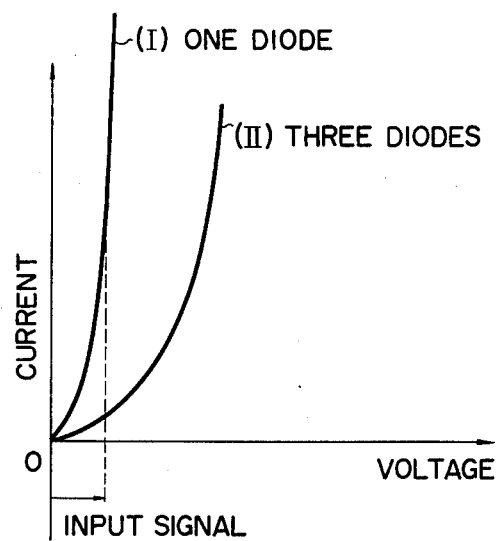

FIGS. 6A and 6B give a comparison in terms of time between the voltage of an input signal and that of an output signal of the embodiment shown in FIG. 5; and FIG. 7 denotes the input-output characteristics of a diode to explain the embodiment shown in FIG. 5.

Figure 1:
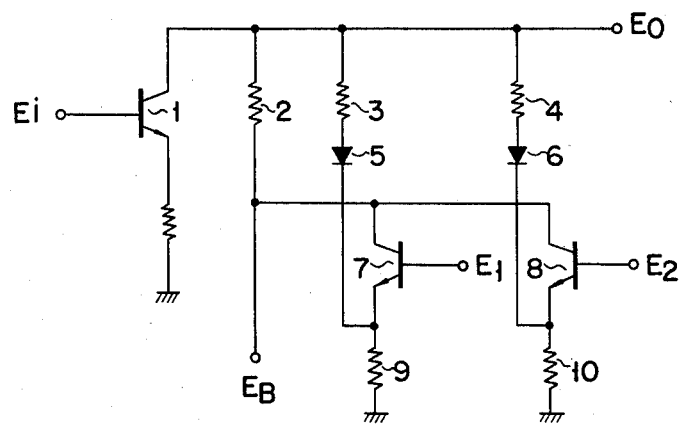
FIG. 1 is a circuit diagram of one embodiment of a gamma circuit of this invention.

FIG. 1 shows one embodiment of the gamma circuit of this invention. A video input signal is changed to an input signal $E_i$ by direct current reproduction in a clamping circuit (not shown). The input signal $E_i$ is amplified by an amplifier comprising an npn type transistor 1. The output terminal of the amplifier or the collector terminal of the transistor 1 is connected to a positive source $E_B$ through a load resistor 2 and to the anodes of diodes 5, 6 through the corresponding resistors 3, 4 respectively.

The cathodes of the diodes 5, 6 are respectively connected to the emitter output terminals of the transistors 7, 8 each forming an emitter follower circuit. The emitters of the transistors 7, 8 are respectively grounded through the resistors 9, 10 and the collectors of the transistors 7, 8 are jointly connected to the positive source $E_B$. Control signals $E_1$, $E_2$ are respectively supplied to the bases of the transistors 7, 8. The collector output signal of the transistor 1 forms the output signal $E_0$ of the gamma circuit.

The operation of the gamma circuit described above will be further detailed with reference to FIGS. 2 to 4.

Figure 2:
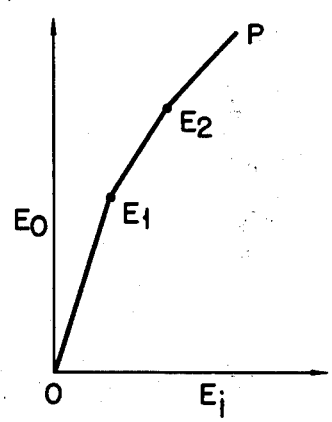
FIG. 2 represents the gamma characteristics of the embodiment shown in FIG. 1.

If the control signal $E_1$ has a higher voltage level than the control signal $E_2$, the gamma characteristics present a direct line 0–$E_1$ as shown in FIG. 2, before the anode voltage of the diode 5 reaches a sum of the emitter voltage of the transistor 7 and the forward barrier voltage of the diode 5. When the anode voltage exceeds the sum, the diode 5 turns conductive and the resistor 3 is connected parallel to the transistor 1, thereby decreasing the degree of amplification by the transistor 1. Thus, the gamma characteristics display a line $E_1$–$E_2$ as shown in FIG. 2. When the output voltage of the transistor 1 rises further and the anode voltage of the diode 6 exceeds the sum of the forward barrier voltage of the diode 6 and the emitter voltage of the transistor 8, then the diode 6 is rendered conducting. At this time the resistor 4 is also connected parallel to the transistor 1, thereby causing the degree of amplification to fall again. Thus the gamma characteristics present a line $E_2$–P as shown in FIG. 2. The output voltage $E_0$ at the point where the gamma characteristics are changed is a function of the control signals $E_1$ and $E_2$ supplied to the bases of the respective transistors 7, 8. Thus, the characteristics-changing points are designated as $E_1$ and $E_2$ in FIG. 2. The gamma circuit of FIG. 1 displays polygonal characteristics as shown in FIG. 2 and these polygonal characteristics approximate the desired gamma characteristics. The optional gamma characteristics can be attained by properly selecting the control voltages $E_1$, $E_2$ or resistance of the resistors 3, 4.

The gamma circuit of FIG. 1 makes temperature compensation as follows.

Figure 3:
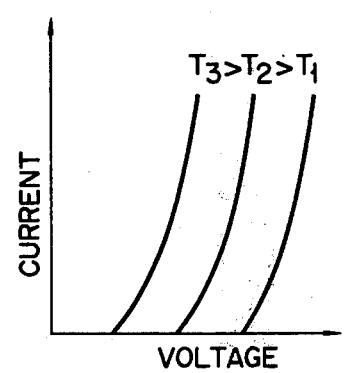
FIG. 3 shows voltage-current characteristics of a diode in terms of temperature.
Figure 4:
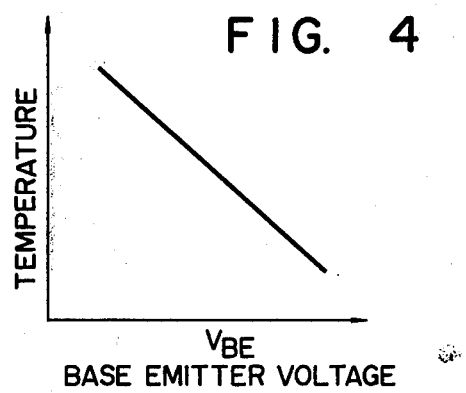
FIG. 4 shows the characteristics of an emitter-base voltage of an npn transistor in terms of temperature.

According to the voltage-current characteristics of the diodes 5, 6 the forward barrier voltage progressively falls, as shown in FIG. 3, with the increase of ambient temperatures $T_1$, $T_2$ and $T_3$ in the order mentioned. As shown in FIG. 4, the base-emitter voltage $V_{BE}$ of the transistors 7, 8 also falls with the increase of ambient temperature because the voltage $V_{BE}$ of the transistors 7, 8 corresponds to the forward barrier voltage of the diodes 5, 6. Where, therefore, the control voltages $E_1$ and $E_2$ are kept constant, the emitter voltage rises and approaches the base voltage with increasing temperature. The emitter voltage thereof falls and becomes more different from the base voltage thereof with the fall of temperature.

In the gamma circuit of this invention the output voltages of the emitter follower transistors 7, 8 are applied to the cathodes of the diodes 5, 6 respectively, as described above. While increased ambient temperature causes the forward barrier voltage of diodes 5, 6 to fall, thereby reducing the turn-on voltage thereof, said increased temperature causes the base-emitter voltage $V_{BE}$ of the transistors 7, 8 to fall and the emitter voltage thereof and the cathode voltage of the diodes 5, 6 to rise, thereby increasing the turn-on voltage of the diodes. Thus, the decrease of the turn-on voltage due to the fall of the forward barrier voltages of diodes 5, 6 is counteracted by the increase of the cathode voltage thereof.

Where ambient temperature falls, the gamma circuit operates conversely and counteracts the resultant effect on the diodes.

According to the embodiment of this invention, the turn-on voltage of the diodes 5, 6 is maintained constant regardless of varying ambient temperature by causing changes in the forward barrier voltage of diodes 5, 6 to be offset by those in the base-emitter voltage of the transistors 7, 8. Accordingly, even when ambient temperature varies, the characteristics-varying points $E_1$, $E_2$ of the polygonal characteristics shown in FIG. 2 are not shifted and the gamma characteristics of the gamma circuit shown in FIG. 1 are kept stable. Adoption of the emitter follower circuit having a very low output impedance does not obstruct the desired gamma characteristics.

In the embodiment of FIG. 1, two diodes are connected parallel to the load resistor, thereby approximating the desired gamma characteristics curve by plotting two characteristics-changing points $E_1$, $E_2$. It is clear that the number of the diodes is not limited to two and at least one diode may be connected parallel to the amplifiers. A larger number of parallel connected diodes leads to an increasing number of characteristics-changing points being plotted. Transistors of diode connection may be used in place of diodes 5, 6.

As described above, the gamma circuit of this invention can perform a complete temperature compensation by simple arrangement, thereby enabling a good image to be always reproduced on the screen of the picture tube. Further, this invention does not necessitate the use of a high level video signal to decrease the effect of the temperature characteristics of the diode on the gamma characteristics, thereby decreasing a maximum power capacity and admitting of easy circuit integration.

Referring to FIG. 5 showing another embodiment of this invention, a video signal of positive polarity is delivered from the terminal 11 through the capacitor 12 to the base of the npn transistor 13. A positive clamping pulse is supplied from the terminal 14 through the capacitor 15 to the base of the transistor 16. This transistor 16 is a switching transistor for clamping and is rendered conducting only when supplied with a clam$_r$ - ing pulse so as to fix the base voltage of the transistor 13 to a prescribed level. The transistor 16 generally carries out a switching action during the blanking period of a video signal. An input video signal is subjected to direct current reproduction by said switching action. An input signal $E_i$ thus reproduced in the form of direct current is amplified by a differential amplifier comprising npn transistors 13, 17. The emitters of these npn transistors 13, 17 are grounded through a source of constant current 18. The source of the positive voltage $E_B$ is coupled to the collector of the transistor 17 through the load resistor 19. The base of the transistor 17 is supplied with bias voltage having a prescribed level. The source of the positive voltage $E_B$ is also connected to the collector of the transistor 13.

A nonlinear semiconductor circuit comprises a series circuit of three npn transistors 21 to 23, each having a diode type connection in which the collector and base of each transistor are connected to cause the transistor to operate as a diode. The collector of the transistor 21 is coupled to the output of the differential amplifier, that is, the collector of the transistor 17 through a resistor 20. The emitter follower circuit comprises three emitter follower npn transistors 24 to 26 which are cascade-connected and correspond to three transistors 21 to 23 of diode connection, and whose emitters are grounded through the corresponding resistors 27 to 29. The emitter of the transistor 24 forming the output terminal of the emitter follower circuit is connected to the emitter of the transistor 23 of the series circuit, and the base of the transistor 26 of the emitter follower circuit is supplied with the control signal $E_3$. The collectors of transistors 24 to 26 are jointly connected to the source of positive voltage $E_B$.

As shown in FIGS. 6A and 6B, the output signal $E_0$ of the gamma circuit of FIG. 5 rises in the nonlinear form when the input signal $E_i$ linearly increases. When the gamma circuit of FIG. 5 is impressed with increased input voltage $E_i$, the transistors 21 to 23 are rendered conducting. Then the resistor 20 and a series load circuit comprising the resistance components of the transistors 21 to 23 of diode connection are connected parallel to the differential amplifier, thereby causing the amplification degree thereof to fall in accordance with the change of the resistance of the series load circuit.

The gamma characteristics of the gamma circuit of FIG. 5 are explained hereinafter. As shown in FIG. 7, a current-voltage characteristics of one diode are indicated by (I), and the current-voltage characteristics of three diodes magnify a nonlinear portion as shown by (II) with regard to the prescribed voltage amplitude of the input signal. In the nonlinear portion of the current-voltage characteristics of the diode, the higher the voltage of an input signal, the more decreased nonlinearly the resistance component of the diode. With the gamma circuit of FIG. 5, the increased voltage of an input signal leads to a non-linear decline in the load resistance including the total series resistance of the resistance components of the three transistors 21 to 23, thereby causing the output signal $E_0$ of the gamma circuit to vary nonlinearly in accordance with the change of the load resistance, as shown in FIGS. 6A and 6B. The gamma characteristics of the gamma circuit of FIG. 5 are derived from the impedance characteristics of the resistance components of the transistors 21 to 23 of diode connection with the increased voltage of the input signal $E_0$, while said transistors 21 to 23 are conductive. Accordingly, the gamma characteristics of the gamma circuit of FIG. 5 display gamma characteristics bearing a smoother curve than that of the polygonal characteristics of the gamma circuit of FIG. 1. Thus, the embodiment of FIG. 5 displays such gamma characteristics as more effectively correct the input-output characteristics of a color picture tube.

Where it is desired to change the gamma characteristics, it is advised to vary the resistance of the resistor 20 or the control voltage $E_3$, thereby changing the operational voltage of the transistors 21 to 23. FIGS. 6A to 6B show variation in the curve of the gamma characteristics when the control voltage $E_3$ has various values. FIGS. 6A and 6B respectively show the characteristics with the control voltage $E_3$ set at 5.8V or 5.6V, thereby providing a gamma value $\Gamma = 0.7$ or 0.45. The gamma value denotes an exponent in an equation representing the gamma curve.

With the gamma circuit of FIG. 5 in which the series connection circuit of the transistors 21 to 23 of diode type connection and the circuit of the cascade connected emitter follower transistors 24 to 26 are formed of the same number of transistors, variation in the base-emitter voltage of the transistors 21 to 23 resulting from changing ambient temperature is offset by variation in the base-emitter voltage of the transistors 24 to 26. Increased ambient temperature results in the decreased base-emitter voltage of the transistors 21 to 23, thereby reducing the turn-on voltage of the transistors 21 to 23 to a lower level. Since, however, the base-emitter voltage of the transistors 24 to 26 also decreases, the emitter output voltage of the transistor 24 rises with respect to the same control voltage $E_3$, thereby causing the emitter terminal voltage of the transistor 23 to be increased. As the result, the turn-on voltage of the transistors 21 to 23 is raised to a higher level. Notwithstanding variation in ambient temperature, therefore, the collector terminal voltage of the transistor 21 and in consequence the output voltage $E_0$ of the gamma circuit do not change. Accordingly, the gamma characteristics of the gamma circuit of FIG. 5 are not affected by ambient temperature, displaying the same effect as the prior art gamma circuit of FIG. 1. As the emitters of the transistors 25 and 26 are grounded through the respective resistors 28, 29, the collector-emitter current of the transistors 25, 26 is relatively large, causing the input impedance of the transistor 24 to be small. Thus, the emitter impedance and emitter voltage of the transistor 24 are also small. Accordingly, the variation of the emitter voltage of the transistor 24 does not have much influence on the output signal Eo, resulting in a stable operation of the gamma circuit. When the circuit of FIG. 5 is integrated the characteristics of the transistors 21 to 23 can attain the same characteristics of the transistors 24 to 26. Thus the circuit of FIG. 5 is suitable for integration as is the circuit of FIG. 1.

In the embodiment of FIG. 5, three transistors 21 to 23 of diode connection may be replaced by three diodes.

The number of the transistors which are used for the series circuit or for the circuit of cascade connected emitter follower is not limited to three, but this invention is also applicable to a gamma circuit comprising a series circuit and a cascade connected emitter follower circuit formed of any other plurality of transistors. It is also possible to connect parallel to the amplifier a plurality of stages each comprising a series connection of transistors and a circuit of cascade connected emitter follower transistors.

In the foregoing embodiments, npn type transistors are used. However, this invention can be practised with the same effect by applying pnp type transistors.

What we claim is:

1. A gamma correction circuit comprising:
   amplifying means for amplifying an input signal, said amplifying means including input and output terminals;
   a non-linear circuit having a first terminal and a second terminal and a plurality of series-connected diode means connected between said first terminal and said second terminal, the first terminal of said non-linear circuit being coupled to the output terminal of said amplifying means and each of said diode means being connected to have the same polarity so that current flows from the first terminal to the second terminal of said non-linear circuit, wherein the voltage of a signal appearing at the first terminal of said non-linear circuit is varied non-linearly in accordance with the change in the voltage of an input signal to said amplifying means;
   an emitter follower circuit having an input terminal and an output terminal and a plurality of cascaded emitter follower transistors connected between said input and output terminals of said emitter follower circuit, the output terminal of said emitter follower circuit being coupled to the second terminal of said non-linear circuit, each of said emitter follower transistors being connected so that current flows from the input terminal of the emitter follower circuit to the output terminal of the emitter follower circuit, said plurality of cascaded emitter follower transistors being equal in number to said plurality of diode means; and
   circuit means for applying a control signal coupled to the input terminal of said emitter follower circuit, for varying nonlinearity of said input signal;
   whereby a change due to ambient temperature in a voltage across said non-linear circuit is compensated by a change due to ambient temperature in a voltage across said emitter follower circuit.

2. A circuit as in claim 1, wherein:
   each of said diode means comprises a transistor having its base and collector electrodes coupled together for functioning as a diode.

3. A circuit as in claim 1, wherein:
   said circuit is an integrated circuit.

4. A circuit as in claim 1, wherein said amplifying means comprises:
   clamping circuit means for producing a direct current output signal,
   means for applying a video signal to said clamping circuit; and,
   differential amplifier means coupled to said clamping circuit for amplifying said direct current output signal.

* * * * *